United States Patent
Mantha et al.

(10) Patent No.: US 7,385,952 B2
(45) Date of Patent: Jun. 10, 2008

(54) COMMUNICATION CHANNEL STRUCTURE AND METHOD

(75) Inventors: Ramesh Mantha, Toronto (CA); Jeffrey P. Castura, Ottawa (CA)

(73) Assignee: Soma Networks, Inc., San Francisco, CA (US)

( * ) Notice: Subject to any disclaimer, the term of this patent is extended or adjusted under 35 U.S.C. 154(b) by 459 days.

(21) Appl. No.: 10/498,319

(22) PCT Filed: Dec. 13, 2002

(86) PCT No.: PCT/CA02/01928

§ 371 (c)(1),
(2), (4) Date: Feb. 24, 2005

(87) PCT Pub. No.: WO03/055254

PCT Pub. Date: Jul. 3, 2003

(65) Prior Publication Data

US 2005/0157678 A1    Jul. 21, 2005

(30) Foreign Application Priority Data

Dec. 13, 2001  (CA)  .................................. 2364860

(51) Int. Cl.
*H04Q 7/00*   (2006.01)
(52) U.S. Cl. ........................ 370/329; 370/328; 370/346
(58) Field of Classification Search ................ 370/349, 370/337, 329, 346, 328
See application file for complete search history.

(56) References Cited

U.S. PATENT DOCUMENTS 6,226,279 B1 *  5/2001  Hansson et al. ............ 370/329
6,532,225 B1 *  3/2003  Chang et al. ................ 370/341
6,775,259 B1 *  8/2004  Ranta ......................... 370/341
6,778,521 B1 *  8/2004  Korpela et al. ............. 370/345
6,973,058 B2 * 12/2005  Paryani ....................... 370/329

FOREIGN PATENT DOCUMENTS

EP          0744849 A2     11/1996

* cited by examiner

*Primary Examiner*—Lester G. Kincaid
*Assistant Examiner*—Fred Casca
(74) *Attorney, Agent, or Firm*—Katten Muchin Rosenmann LLP (57) ABSTRACT

A novel communication channel structure and method in a wireless communication system is provided. In an embodiment of the invention, the communication system includes a base station and a plurality of subscriber stations and the subscriber stations are given access to a variety of channels, including at least one uplink data channel. The uplink data channel can operate in at least a random access mode and a polled access mode. The base station informs each subscriber station it serves of the current mode of the uplink channel via an associated downlink signaling channel and, in random access mode, each subscriber station is able to randomly access the shared uplink channel. In polled mode, each subscriber station waits for permission from the base station before sending data over the shared uplink channel. A method of operating the system monitors the collisions which occur on the uplink channel in random mode and/or the amount of data and/or the data's priority level and/or QoS requirements and switches the system between random and polled modes as appropriate. In polled mode, the method determines which subscriber stations should access the uplink and when.

25 Claims, 5 Drawing Sheets

COMMUNICATION CHANNEL STRUCTURE AND METHOD

FIELD OF THE INVENTION

The present invention relates telecommunication systems that carry data, voice and/or other services over a communication link, and more particularly relates to a channel structure and method for operating such communication links.

BACKGROUND OF THE INVENTION

Telecommunication services have undergone tremendous advancement in the last decade. As an example, wireless or cellular telephone systems have now become largely ubiquitous. The advancement from analog cellular telephones, to more sophisticated digital telephones that utilize multiple access techniques such as CDMA or GSM has been very rapid.

Cellular digital telephone networks have been engineered primarily to carry voice communications, meaning the connections provided have a fixed maximum data rate, a low latency (as voice communication is sensitive to latency) and the connections can tolerate relatively high error rates (as voice communication can tolerate such error rates).

More recently, attempts have been made to offer data services (i:e. such as web-browsing) over existing cellular digital telephone networks, but in general these services are unacceptably slow, because such services have different requirements than voice communications. Specifically, while data services can accommodate relatively high latencies, they generally require low error rates.

Indeed, another example of recent advances in telecommunication services has been the deployment of IP protocol networks (such as the Internet and other networks), which have been primarily designed to transmit data. The Internet is an example of a network that is optimized for a relatively low error rate, but which is generally tolerant of latency. This optimization has lead to the result that the Internet is a poor medium for carrying voice services.

Recently, much has been written about "convergence", wherein the next generation of telecommunication networks will be engineered to carry voice, data and other services. Such networks are expected to be 'smart', in that they will dynamically vary their prioritization of errors and delay, according to the quality-of-service ("QoS") requirements of the service being carried over that network. Indeed, much hope was expressed for the so-called "3G" or third-generation of wireless phones, which were to offer good quality voice service and data services at high speeds and low error rates. To date however, the expectations of 3G have not been met, as the challenges of providing such networks have proven more greater than expected.

It is recognized, however, that the communication structures that will be required to deliver voice, data and other services at a appropriate QoS can be divided into two categories: delivering the service from the network to the subscriber, and delivering the service from the subscriber to the network. In wireless networks having a base station which communicates with a plurality of subscriber stations, the former category is typically known as the "downlink" and is a one-to-many link, and the latter category is known as the "uplink" and is a many-to-one link.

The 3G standard, available from a variety of sources including the web site of the Third Generation Partnership Project (3GPP) organization (www.3gpp.org) includes a channel structure that is intended to provide an uplink for voice, data and other services at a high QoS. The 3G channel structure includes a DDCH (dedicated data channel) which is intended to provide low latency connections for voice services in both the downlink and uplink directions by reserving transmission resources and a CPCH (common packet channel) which is intended to provide low error rate connections for bursty, latency tolerant, packet-based data on the uplink. In simple terms, the CPCH allows a plurality of subscriber stations to share an uplink to a base station by allowing them to randomly access that common channel. The CPCH is described in detail in the 3G documents and is also described in U.S. Pat. Nos. 6,169,759 and 6,301,286 to Kanterakis et al.

In a very simplified explanation, the subscriber stations served by the Kanterakis CPCH transmit a low power pre-defined sequence to the base station, the sequence representing a request by a subscriber station for permission to transmit on the CPCH at a future time. Once the sequence is transmitted, the subscriber station listens to a corresponding downlink channel from the base station for an authorization or denial to transmit. If the subscriber station does not receive either an authorization or denial from the base station, it will rebroadcast the request sequence to the base station at a higher power level, repeating the process until it receives a denial or authorization. If the subscriber station receives a denial of permission, it makes another request to the base station after a random delay. If the subscriber station receives an authorization, it sends a second request to the base station to confirm the authorization which reduces the chance that two different subscriber stations have made the same request at the same time. If it then receives a second authorization on the corresponding downlink channel, the subscriber station can commence transmitting on the CPCH at the appropriate time and power control information for the transmission on the CPCH is transmitted from the base station to the transmitting subscriber station on yet another channel designed for this purpose. Each of these circumstances and the operation of the CPCH is described in more detail in the above mentioned documents.

The inventors of the present invention have determined that, while the CPCH structure can provide low latencies and a reasonable bandwidth utilization efficiency at low utilization levels (i.e.—few users with little data to send), the performance and efficiency of the CPCH structure decreases significantly at higher utilization levels (i.e.—many users and/or large amounts of data to send). As will be apparent to those of skill in the art, as is the case with all random access techniques, as more subscriber stations attempt to access the CPCH, more collisions will result wherein two or more subscriber stations request permission to transmit at the same time. Because the mechanism for dealing with such collisions in the CPCH is to have the denied subscriber stations retry their request at random intervals, the mechanism quickly degrades to a very low level of efficiency when the number of subscriber stations increases and the latencies and bandwidth utilization efficiency can quickly reach unacceptable levels.

In the 3G system, the CPCH channels are typically over-provisioned in an attempt to mitigate this degradation. It is contemplated that bandwidth utilization efficiencies for the CPCH will not often surpass thirty percent of the maximum theoretical channel capacity.

Another technique for dealing with congested CPCH's is to transfer certain subscriber stations to DDCHs for their uplinks but, while this can result in good latency times, it results in poor utilization of radio resources as DDCH channels are not shared and are not radio resource efficient when transmitting bursty data.

In general, the inventors of the present invention believe that the CPCH can offer good performance for bursty data traffic at low levels of utilization, but is not suitable for higher levels of utilization.

It is therefore desired to provide a communication channel structure and method which makes efficient utilization of radio bandwidth and which is capable of providing low latency and/or low error rate communications.

SUMMARY OF THE INVENTION

It is therefore an object of the invention to provide a novel communication channel structure and method that obviates or mitigates at least one of the disadvantages of the prior art.

According to a first aspect of the present invention, there is provided radio communication system comprising:

a base station;

a plurality of subscriber stations;

a channel structure operating between said base station and plurality of subscriber stations, said channel structure including at least one uplink channel and an associated downlink control channel shared by at least two of said plurality of subscriber stations and said base station, said associated downlink control channel indicating to said at least two subscriber stations whether said uplink channel is in polled mode, wherein one of said at least two subscriber stations is specified to next transmit to said base station, or random mode wherein any of said at least two subscriber stations with data to be sent to said base station can next transmit to said base station.

Preferably, when a subscriber station is specified to next transmit to the base station, the transmission from the specified subscriber includes an indication of the amount of data waiting to be transmitted from the specified subscriber station. Also preferably, when the data is transmitted over the at least one uplink channel in random mode, the associated downlink signaling channel subsequently provides an indication of successful reception at said base station. Also preferably, the base station further includes a scheduler which determines the amount of data to be transmitted from the at least two of the plurality of subscriber stations to the base station and places the at least one uplink channel into random mode when the determined amount is less than a predetermined amount and in polled mode when the determined amount is not less than the predetermined amount. Also preferably, the scheduler also compares the amount of data to be transmitted from each of the at least two of the plurality of subscriber stations to a second predetermined amount and places the at least one uplink channel into random mode when the amount of data to be transmitted from each of at least two of the plurality of subscriber stations is less than the second predetermined amount and in polled mode when the amount of data to be transmitted from any of at least two of the plurality of subscriber stations is not less than the second predetermined amount.

In another preferred aspect, the scheduler places the uplink channel into random mode until the number of collisions which occurs within a given time period exceed a predetermined number when the scheduler will place said uplink channel into polled mode.

Preferably, the system includes at least two uplink channels and associated downlink control channels, the base station assigning different sets of the plurality of subscriber stations to use each of the two uplink channels. Also preferably, a first one of the at least two uplink channels has a transmission capacity greater than a second one of the at least two uplink channels and the base station assigns subscriber stations with higher transmission capacity needs to the first one uplink channel and assigns subscriber stations with lesser transmission capacity needs to the second one uplink channel. Also preferably, the assignment of the subscriber stations to said uplink channels is reviewed periodically and the subscriber stations are reassigned between the first one and said second one uplink channel as appropriate.

Also preferably, the associated downlink signaling channel also provides transmission power control information to a subscriber station transmitting on the uplink channel. Also preferably, a transmitting subscriber station does not transmit payload data until it receives a selected amount of transmission power control information from the base station.

According to another aspect of the present invention, there is provided a method of operating a radio communication system including a base station and a plurality of subscriber stations, the system having a communication channel structure including at least one uplink channel and an associated downlink control channel shared by at least two of said plurality of subscriber stations, the method comprising the steps of:

(i) said base station placing said at least one uplink channel into one of a random mode and a polled mode;

(ii) communicating to said at least two subscriber stations via said associated downlink control channel the operating mode of said uplink channel and, if said operating mode is polled, the one of said at least two subscriber stations which is selected to use said uplink channel;

(iii) each of said at least two subscriber stations determining said operating mode of said uplink and:
  (a) if said operating mode is random, any of said at least two subscriber stations having data to be transmitted to said base station transmitting that data over said uplink channel; or
  (b) if said operating mode is polled, each of said at least two subscriber stations further determining if it is the selected subscriber station, the selected subscriber station transmitting to said base station over said uplink channel at least an indication of the amount of data it has to be transmitted to said base station and each other of said at least two subscriber stations not transmitting;

(iv) said base station receiving said transmission over said uplink channel and placing said uplink channel into a selected operating mode for a next transmission; and (v) repeating steps (ii) through (v).

Preferably, step (iv) comprises maintaining the selected operating mode as random mode until a selected number of collisions occur within a selected timeframe after which the operating mode is set to polled for at least a period of time. Also preferably, the period of time for the operating mode to be polled is the time necessary for the amount of data waiting at the at least two subscriber stations to fall below a selected threshold amount.

Preferably, the base station includes at least two uplink channels and associated downlink control channels and further including the step of assigning each of the at least two subscriber stations to use a different one of the at least two uplink channels and the associated downlink control channel and wherein steps (i) through (v) are performed for each of the at least two uplink channels. Also preferably, at least one of said at least two uplink channels has greater transmission capacity than another of the at least two uplink channels and further including the step of assigning each of the at least two subscriber stations to use a different one of the at least two uplink channels and the associated downlink control channel and wherein steps (i) through (v) are performed for each of the at least two uplink channels. Also preferably, the base station monitors the level of utilization of each of the at least two uplink channels and reassigns subscriber stations between the at least two uplink channels to improve the balance of utilization of the at least two uplink channels.

Preferably, each subscriber station transmitting on an uplink channel receives transmission power control information from the base station on the associated downlink control channel during said transmission.

According to yet another aspect of the present invention, there is provided a subscriber station for use in a communication system having a base station and a plurality of subscriber stations, the subscriber station comprising:

a receiver to receive a downlink control signal channel from said base station indicating the operating mode of an uplink from said subscriber station to said base station;

control means to determine from said received downlink control signal channel the operating mode of said uplink and, if the determined operating mode is polled, to determine from said received downlink control signal if the subscriber station is authorized to transmit to said base station on the uplink;

processor means to construct a frame of data for transmission to said base station if the subscriber station is authorized to transmit or if the determined operating mode is random and said subscriber station had data to transmit to said base station; and a transmitter to transmit said constructed frame of data to said base station, said transmitter transmitting said constructed frame at transmission power levels set according to power control information received by said receiver from said base station.

A wireless communication system includes a base station and a plurality of subscriber stations and the subscriber stations are given access to a variety of channels, including at least one uplink data channel. The uplink data channel can operate in at least a random access mode and a polled access mode. The base station informs each subscriber station it serves of the current mode of the uplink channel via an associated downlink signaling channel and, in random access mode, each subscriber station is able to randomly access the shared uplink channel. In polled mode, each subscriber station waits for permission from the base station before sending data over the shared uplink channel. A method of operating the system monitors the collisions which occur on the uplink channel in random mode and/or the amount of data and/or the data's priority level and/or QoS requirements and switches the system between random and polled modes as appropriate. In polled mode, the method determines which subscriber stations should access the uplink and when.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
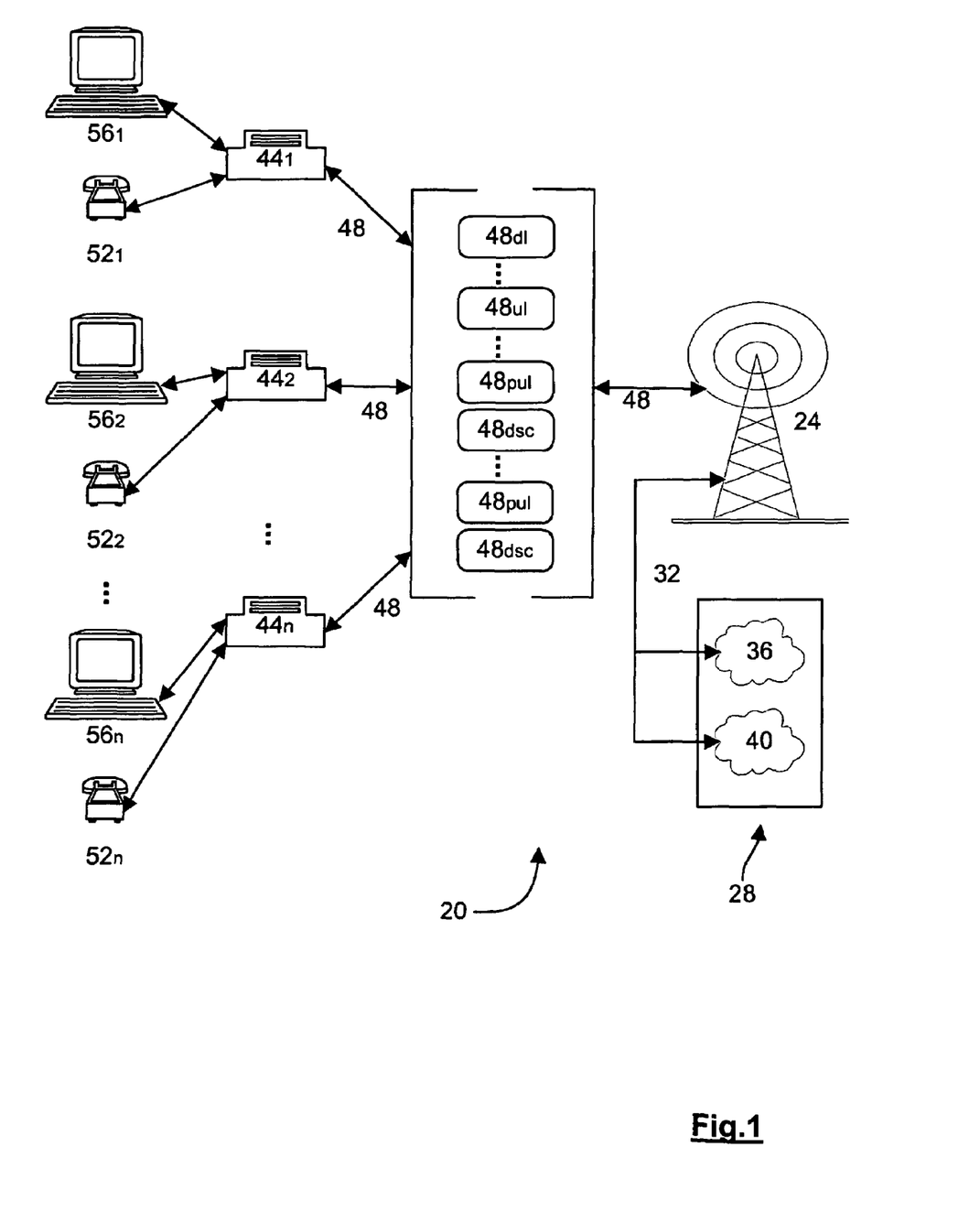
FIG. 1 is a schematic representation of a system employing an uplink structure and method in accordance with an embodiment of the invention.

Referring now to FIG. 1, a wireless local loop system is indicated generally at 20. System 20 includes a wireless base station 24 that connects, through appropriate gateways, to a communication network 28 via a backhaul 32. Network 28 can be operable to carry different types of communication services, which in the present embodiment includes both data to and from public switched telephone network (PSTN) 36 and data to and from a packet switched data network 40, such as the Internet, although network 28 can also be a converged network, etc. as will be apparent to those of skill in the art. Backhaul 32 can be any known type of suitable backhaul link between wireless base station 24 and network 28, such as a T1, T3, OC1 or a wireless microwave link, etc.

Base station 24 has a transceiver that is used for communicating with a plurality of subscriber stations $44_1$ through $44_v$ via a wireless link 48. In a present embodiment, wireless link 48 employs CDMA as a multiple access technique to channelize and share link 48, although other multiple access techniques such as OFDM, etc. can be used. Also, in a present embodiment wireless link 48 is a frequency division duplexed link (FDD), although it can also be a time division duplexed link (TDD) or other configurations as will occur to those of skill in the art.

Wireless link 48 is arranged in a structure having a plurality of channels, including at least one downlink channel $48_{dl}$ and at least one uplink channel $48_{ul}$. As used herein, the term downlink channel is intended to comprise any channel employed by a transmitter to communicate with multiple receivers and in the present specific example base station 24 can broadcast to one or more subscriber stations 44 over a downlink channel $48_{dl}$. Also, as used herein, the term uplink channel is intended to comprise any channel shared between multiple transmitters transmitting at different times to the same receiver, and in the present specific example one or more subscriber stations 44 can broadcast to base station 24 over an uplink channel $48_{ul}$.

Base station 24 also includes a modem for effecting appropriate packaging (i.e.—spreading, modulation, symbol repetition, forward error correction, etc.) for the data sent over downlink channel $48_{dl}$ to subscriber stations 44 and to perform the inverse operations on data received over uplink channel $48_{ul}$ from subscriber stations 44.

Each subscriber station 44 has a transceiver whose receiver portion is operable to receive, from base station 24, data and signaling information carried over link 48. Each subscriber station 44 also includes a modem which is operable to process (i.e.—unpackage by despreading, demodulating, decoding, etc.) the received data from base station 24 over downlink channel $48_{dl}$ and to appropriately package data for transmission to base station 24 over uplink channel $48_{dl}$.

Each subscriber station 44 can be connected to a telephony device 52 such as a plain old telephone system (POTS) telephone, etc. and/or a data device 56, such as a personal computer equipped with a network interface card (NIC) to connect to subscriber station 44 via a suitable means such as an Ethernet port or a universal serial bus (USB) port. In general, it will be understood that each telephony device 52 is operable to process voice telephone calls carried over PSTN 36, while data devices 56 are operable to process data such as applications carried over packet switched data network 40.

In a present embodiment, each subscriber station 44 is typically located within a subscriber's premises and thus system 20 is part of a wireless local loop (WLL). However, it is also contemplated that the present invention is applicable to mobile, or nomadic, subscriber stations 44, such as web-enabled mobile cellular phones. It will also be apparent that telephony device 52 and data device 56 can be combined into a single intelligent device, such as a cellular phone with a built-in web browser or any other intelligent device that is operable to process both voice and data. It is also contemplated that telephony devices 52 and/or data devices 56 can be connected to subscriber station 44 through a network, such as an Ethernet, IEEE 802.11b, Bluetooth or other local wired or wireless network.

One suitable structure for a downlink is discussed in Canadian Patent Application 2,310,188 to Frazer et al., assigned to the assignee of the present invention, and the contents of which are incorporated by reference herein. Downlink channel $48_{dl}$ can implemented using, for example, the connectionless shared data channels discussed in this reference whereby one or more subscriber stations 44 can "listen" to the downlink channel $48_{dl}$ and extract data packets addressed to a respective subscriber station 44 from the shared data channel.

A downlink channel $48_{dl}$ can also be implemented using the connection-like dedicated channels also discussed in U.S. Pat. No. 2,310,188, whereby the channel behaves like a dedicated wired voice telephone connection. In another alternative two (or more) downlink channels $48_{dl}$ can be provided, wherein one set of downlink channels $48_{dl}$ are implemented using connectionless shared data channels and other downlink channels $48_{dl}$ are implemented using connection-like dedicated channels. However, other ways of structuring the downlink to provide services for voice and data or for data types requiring different QoS levels will occur to those of skill in the art and are within the scope of the invention.

An uplink channel $48_{ul}$ can also be implemented in a variety of manners, including uplink channels similar to the uplink DDCH channels proposed in the 3G specification which are assigned and reassigned to subscriber stations as needed.

In the present invention, an uplink channel $48_{pul}$ particularly suited for the transmission of packet data has been created and is paired with a downlink signaling channel $48_{dsc}$ and each of these channels is described in more detail below.

In a present embodiment, a basic frame structure which is very similar to that proposed by the 3GPP organization is employed throughout system 20. Transmissions are arranged in frames of fixed duration, the frames being sub-divided into a fixed number of time slots. In the present embodiment, these frame structures are ten milliseconds in length and are composed of fifteen equal duration time slots. Also, in the present embodiment which employs CDMA as a multiple access technique, a chip rate of three-million, eight-hundred and forty-thousand chips per second is employed in system 20. Thus a frame of ten milliseconds duration includes thirty-eight thousand, four-hundred thousand chips, with each of the fifteen time slots of the frame including two-thousand, five-hundred and sixty chips. As will be apparent to those of skill in the art, other multiple access techniques, chip rates and/or numerologies can be employed without departing from the scope of the present invention.

Figure 2:
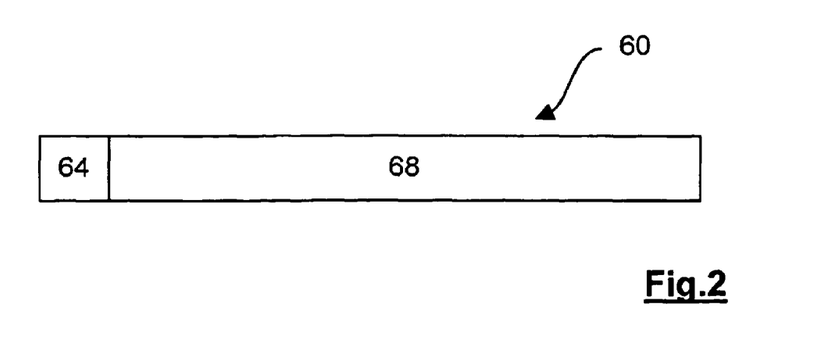
FIG. 2 is a schematic representation of a configuration of a frame structure for a downlink signaling channel used in the system of FIG. 1.

Referring now to FIG. 2, an exemplary downlink signaling channel $48_{dsc}$ frame structure is indicated generally at 60 and frame structure 60 comprises an active subscriber station field 64 and a signaling information field 68. In a present embodiment, the spreading factor for downlink signaling channel $48_{dsc}$ is five-hundred and twelve and QPSK modulation is employed, providing one-hundred and fifty bits per frame 60 (ten bits per each of the fifteen slots), some which are used for forward error correcting purposes and power control signaling, as described below, leaving twenty-four bits available for other purposes. In the present embodiment, active subscriber station field 64 comprises six bits, which can indicate any one of up to sixty-three different active subscriber stations 44 and signaling information field 68 comprises eighteen bits.

Each uplink channel $48_{pul}$ and its paired downlink signaling channel $48_{dsc}$ has a number of subscriber stations 44 assigned to it by system 20. The actual number of subscriber stations 44 assigned to an uplink channel $48_{pul}$ in a present embodiment of the invention typically will not exceed thirty, but it is contemplated that this number can be larger or smaller if desired and depends upon a variety of factors, including the QoS requirements (latency, data rate, etc.) of the services and applications in use at the subscriber station 44, the capacity of the uplink channel $48_{pul}$, the loading of other uplink channels in system 20, etc. System 20 can transfer the assignment of subscriber stations 44 from one uplink channel $48_{pul}$ to another as required.

Each downlink signaling channel frame 60 is transmitted to all subscriber stations 44 presently assigned to the corresponding uplink channel $48_{pul}$ within system 20 and is intended to be decoded and utilized by all those subscriber stations 44. Accordingly, downlink signaling channel $48_{dsc}$ is a broadcast channel and is transmitted at a power level and with a level of forward error correction coding and symbol repetition selected by base station 24 to ensure a relatively high likelihood that the intended subscriber stations 44 will be able to successfully receive it.

In a present embodiment, two general types of access modes for uplink channel $48_{pul}$ are contemplated, namely "random" and "polled", each of which is described in more detail below. One or more values for active subscriber station field 64 are reserved for indicating random access modes and the other values for active subscriber station field 64 indicate the subscriber station which is next authorized to use uplink channel $48_{pul}$ and thus implicitly indicate that uplink channel $48_{pul}$ is in polled mode, as described below.

Signaling information field 68 can include any desired signaling information for the associated uplink channel $48_{pul}$ and includes power control signals and, typically, at least signals indicating the spreading factor to be employed by the subscriber station 44 which will broadcast on the associated uplink channel $48_{pul}$. Other types of signaling information that can be included in signaling information field 68 will also occur to those of skill in the art.

Figure 3:
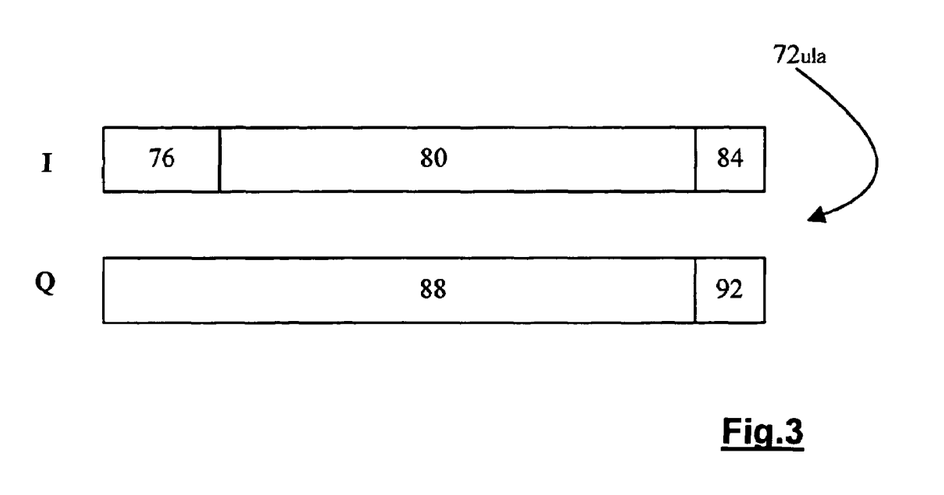
FIG. 3 is a schematic representation of a first configuration of a frame structure for the uplink structure used in the system of FIG. 1.

In FIG. 3, a first configuration for the frame structure of uplink channel $48_{pul}$ is indicated at $72_{ula}$. As shown in FIG. 3, uplink channel frame structure $72_{ula}$ comprises an I (inphase) portion and a Q (quadrature) portion. As known to those of skill in the art, the I and Q portions are modulated onto a physical channel by subscriber station 44 using quadrature modulation techniques for transmission over link 48, although the present invention is not so limited and any other suitable modulation technique can be used. In a present embodiment, the I portion of uplink frame structure $72_{ula}$ includes a DTX field 76 for the first four slots (10240 chips). DTX field 76 comprises "Do Not Transmit" (DTX) symbols, which are zero transmission energy symbols, and is employed to allow the transmitting subscriber station 44 to acquire power control information from base station 24 for its transmission before it commences transmitting payload data. As will be apparent to those of skill in the art, DTX field 76 can be changed to employ fewer or more slots of DTX symbols if required in other circumstances, such as for systems having different chip rates, poor channel characteristics (severe fading), etc.

Specifically, the downlink signaling channel $48_{dsc}$ carries power control information, derived by base station 24 in any suitable manner such as from the pilot signal broadcast by subscriber station 44 in the Q portion (described below), to the subscriber station 44 which adjusts its transmission power accordingly. As any particular subscriber station 44 may not have broadcast to base station 24 for a relatively long time, such subscriber stations 44 can have very poor initial estimates of the required transmission power levels and by allowing for four slots of power control correction information to be received at a subscriber station 44 before it transmits any payload data, it is believed that better system performance can be obtained in this manner.

After DTX field 76, the I portion of uplink frame structure $72_{ula}$ includes a traffic data field 80, which contains actual payload data to be transmitted from subscriber station 44, for the remaining slots (in this embodiment eleven), less the final two-hundred and fifty-six chips.

The final two-hundred and fifty-six chips of the I portion of uplink frame structure $72_{ula}$ represent a guard time field 84, composed of DTX symbols. This guard time field 84 is provided to prevent variation in clocks (asynchronicity) at different subscriber stations 44 and different round trip delays (due to different distances of subscriber stations 44 from base station 24) from resulting in the beginning of a subsequent transmission from a second subscriber station 44 from colliding (i.e.—over writing) with the end of a preceding transmission of a first subscriber station 44. The length of guard time field 84, and DTX filed 76, can be varied as necessary for specific circumstances, such as contemplated longer round trip delays, different ship rates, etc.

The Q portion of uplink frame structure $72_{ula}$ is composed of signaling information 88 that is utilized by base station 24 to assist in the decoding of uplink channel $48_{pul}$. In the present embodiment of the invention, signaling information 88 includes a pilot signal which base station 24 uses to acquire the subscriber station 44 and to determine the power level it is received at for power control purposes.

Specifically, the spreading factor selected for the Q portion is two-hundred and fifty-six and thus each slot allows transmission of ten bits of pilot signal. If traffic data field 80 is not always full, or is not padded to be full, in another embodiment of the present invention each slot of the Q portion can include eight bits of pilot data and two bits which comprise a portion of a length indicator. When the entire Q portion of the frame is received, the two bits of length indicator of each slot are combined to provide a length indication for the data in traffic data field 80. Because a reduced number of pilot signal bits are sent in this embodiment compared to the ten bit embodiment, as some of the otherwise available bits are occupied with length bits, this latter embodiment does require additional power to be allocated to the Q portion to achieve the same probability of reception of the pilot signal at base station 24. This requires a corresponding reduction in the power allocated to I portion, resulting in reduced overall throughput of payload data.

Finally, the Q portion of uplink frame structure $72_{ula}$ also includes a guard time field 92, which also contains DTX symbols and occupies the final two-hundred and fifty-six chips of the final slot of the Q portion of uplink frame structure $72_{ula}$. Thus, when I and Q portions are modulated for physical transmission over link 48, guard time fields 84 and 92 appear as a single guard time of no transmission energy, thereby offering protection for clock drift (asynchronicity) between subscriber stations 44.

Figure 4:
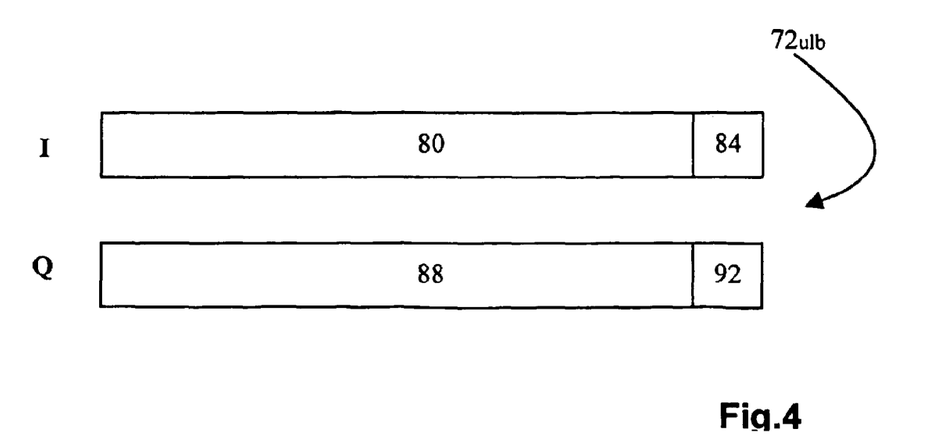
FIG. 4 is a schematic representation of a second configuration of the frame structure shown in FIG. 3.

Referring now to FIG. 4, a second configuration of an uplink frame structure is indicated at $72_{ulb}$. Frame structure $72_{ulb}$ also comprises an I portion and a Q portion, which are the same as the I and Q portions of uplink channel frame structure $72_{ula}$, with the exception that DTX field 76 of uplink channel frame structure $72_{ula}$ is omitted from uplink channel frame structure $72_{ulb}$, allowing an increased amount of payload data to be included in traffic data field 80 in structure $72_{ulb}$. As described in more detail below, when a subscriber station 44 is sending consecutive frames of data in uplink channel $48_{pul}$ to base station 24, the first frame on uplink channel $48_{pul}$ will be in frame structure $72_{ula}$ which provides DTX field 76 allowing the subscriber station 44 to receive four slots of initial power control information from downlink signaling channel $48_{dsc}$ to establish a power control loop before commencing transmission of traffic data field 80. The next and each consecutive frame sent on uplink channel $48_{pul}$ can be in frame structure $72_{ulb}$, as subscriber station 44 will have already established a power control loop and thus will not require the establishment of the power control loop, and instead will merely continue the loop established and/or maintained on the preceding frame transmitted on uplink channel $48_{pul}$. Further details of the fields in uplink channel frame structures $72_{ula}$ and $72_{ulb}$ will become apparent in the subsequent discussions made with reference to operation of system 20.

In a present embodiment, the power level adjustment signals carried in signaling information field 68 of downlink signaling frame 60 are simply either an instruction to "increment" or "decrement", represented as an appropriate bit value, from base station 24. Specifically, a "1" value can indicate that power levels are to be incremented and a "0" value can indicate that power levels are to be decremented. The amount of the change, whether an increment or decrement, is preset according to the slot in which the change occurs. A presently preferred increment/decrement level for each slot in frame structure $72_{ula}$ is shown in Table I, however other preset levels will occur to those of skill in the art according to desired performance of system 20.

TABLE I

Power level control increment/decrement for frame structure $72_{ula}$

| Slot | Preset increment/decrement level (based on received power control instruction) |
|---|---|
| 1 | ±3.5 dB |
| 2 | ±3 dB |
| 3 | ±2 dB |
| 4 | ±1.5 dB |
| 5-15 | ±0.5 dB |

Thus, a "1" value in slot one will result in a 3.5 dB increment in the transmission power level, while a "0" value in the same slot results in a decrement of 3.5 dB in the transmission power level. A "1" value in slot two results in a 3 dB transmission power level increment and a "0" value in slot two results in a 3 dB transmission power level decrement, etc.

It is thus believed that the power level output for uplink channel $48_{pul}$ from a particular subscriber station 44 will have reached an acceptable level by the time slot five of frame structure $72_{ula}$ is prepared for transmission of traffic data filed 80 over uplink channel $48_{pul}$. Increment/decrement power control instructions continue to be received by subscriber station 44 from base station 24 during the assembly and transmission of each of slots five through fifteen allowing subscriber station 44 to increment or decrement the transmission power level according to the preset levels shown in Table I, as necessary.

Therefore, slots five through fifteen of the I portion of configuration $72_{ula}$ include payload data for transmission over uplink channel $48_{pul}$, with the exception that the final two-hundred and fifty-six chips of slot fifteen are reserved for DTX bits, as discussed above.

For each slot of frame structure $72_{ulb}$, where active power control is already in effect for the subscriber station 44 as it also transmitted the immediately preceding frame, the increment/decrement value for each slot can be fixed, for example ±0.5 dB.

Figure 5:
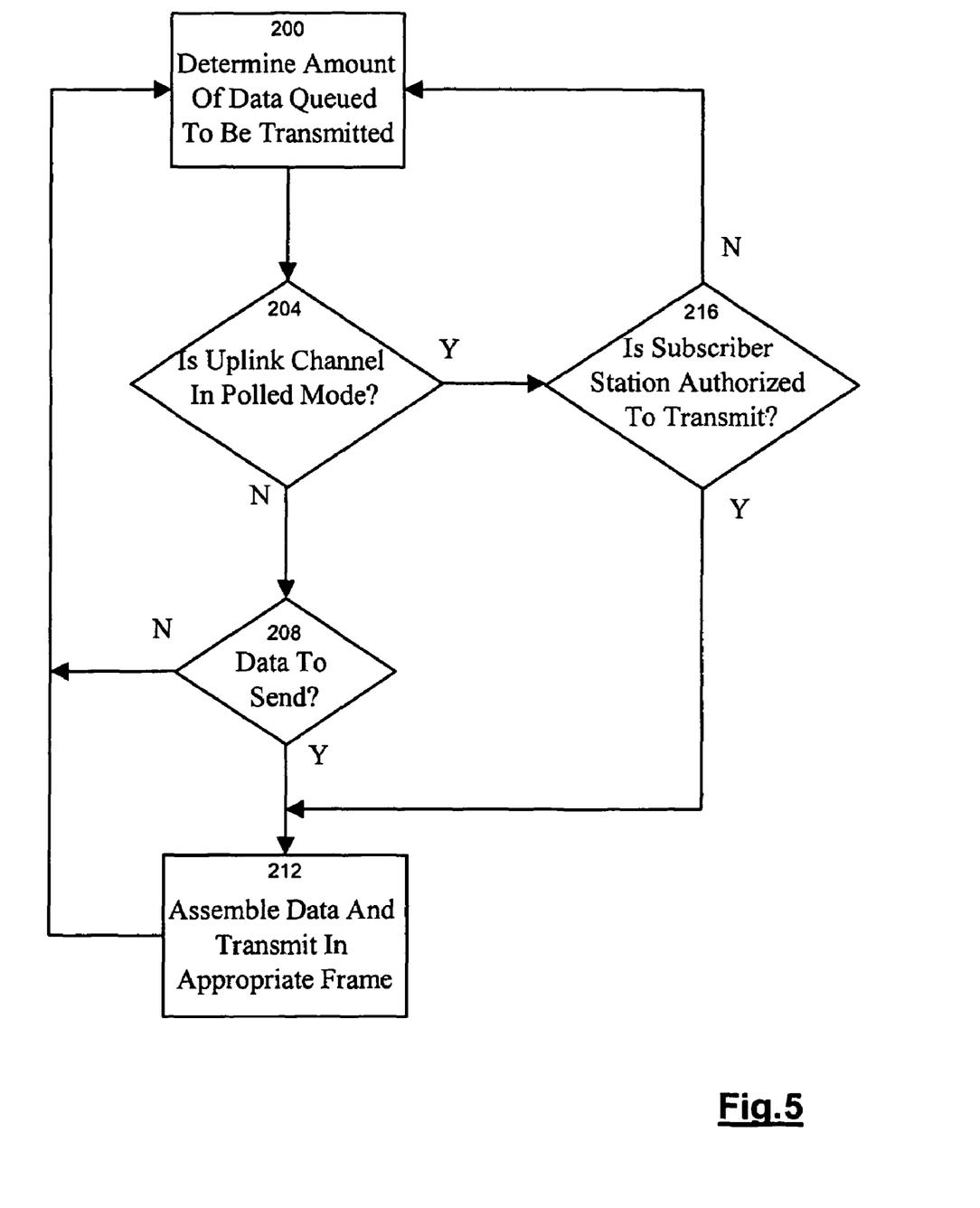
FIG. 5 is a flow-chart showing a method of operating each of the subscriber stations shown in FIG. 1.

FIG. 5 shows a flow-chart representing a method for operating a subscriber station, in accordance with another aspect of the present invention. In order to assist in the explanation of the method shown in FIG. 5, reference will be made to system 20 of FIG. 1 and, in particular, reference will be made to the operation of one subscriber station 44 transmitting over an uplink channel $48_{pul}$.

As part of its normal operation, each subscriber station 44 maintains one or more queues of data to be transmitted to base station 24. These queues can contain data from telephony devices 52 and/or data devices 56 served by subscriber station 44 and/or can contain signaling, control or other data generated by subscriber station 44 itself. In system 20, whenever a subscriber station 44 transmits over an uplink channel $48_{pul}$ it provides an indication of the amount of data presently in its queue, or queues. This indication can be achieved in a variety of manners, and in a present embodiment a single byte is transmitted, this byte being mapped to an agreed table of value ranges.

For example, each of the two-hundred and fifty-six values which can be represented by the byte can indicate one-thousand twenty-four bytes (one KB) of data to transmit. Specifically, a "0" value can indicate that a subscriber station 44 has between zero bytes and one KB of data to transmit, a "1" value indicates that the subscriber station 44 has between one KB and two KB of data to transmit, a "3" value indicates that the subscriber station has between two KB and three KB of data to transmit, etc., and a value of two-hundred, fifty-five indicates that the subscriber station 44 has over two-hundred, fifty-five KB of data to transmit.

As will be apparent to those of skill in the art, a variety of other mappings can be employed as desired. For example, each value can indicate a larger increment of data, i.e.—a value of "0" can indicate between one byte and four KB of data to be transmitted, a value of "1" can indicate between four KB and eight B to be transmitted, etc. and a value of two-hundred fifty-five can indicate more than one MB, or any other arbitrary amount, of data to be transmitted.

Alternatively, values between "0" and "128" can indicate amounts of data with a first priority to be transmitted and values between "129" and "255" can indicate corresponding amounts of data, albeit with a different priority, to be transmitted. If more than one queue is present in subscriber station 44, the byte can be masked/mapped to provide information about each queue, for example the four most significant bits representing the amount of data in the first queue and the four least significant bits representing the amount of data in the second queue, etc. Other suitable ways of representing and reporting subscriber station 44 queue lengths and data characteristics will be readily apparent to those of skill in the art.

It is contemplated that a variety of other techniques can be employed to report the amount of data queued to be transmitted.

Base station 24 will use the received information representing the amount of data queued to be transmitted from the subscriber station 44 to determine when a subscriber station 44 should next be authorized to transmit to base station 24, if the uplink channel $48_{pul}$ is in polled mode, and/or whether uplink channel $48_{pul}$ should be in polled or random access modes, as described below.

Before step 200 of FIG. 5, as part of the normal operations of system 20, subscriber station 44 has been assigned to an uplink channel $48_{pul}$ and a corresponding downlink signaling channel $48_{dsc}$ which it monitors.

At step 200, subscriber station 44 determines the amount of data, if any, it has in its queue, or queues, to transmit to base station 24. At step 204, subscriber station 44 determines (by examining the active subscriber station field 64 in the last DSC frame 60 received on the downlink signaling channel $48_{dsc}$ it is monitoring or by any other suitable method as will be apparent to those of skill in the art) whether uplink channel $48_{pul}$ is in random access or polled mode. If at step 204 it is determined that uplink channel $48_{pul}$ is not in polled mode, i.e.—it is in random access mode, at step 208 a determination is made as to whether subscriber station 44 has data to send to base station 24.

In the present invention, when active subscriber station field 64 indicates the mode of uplink channel $48_{pul}$, that mode applies to a known future time and not necessarily the mode that uplink channel $48_{pul}$ is in at the present time. Specifically, in most circumstances a subscriber station 44 will require some finite period of time to prepare, assemble and package data for transmission and each subscriber station 44 will be informed, implicitly or explicitly, that the contents of active subscriber station field 64 refer to a frame a number of frames after the current frame. In other words, if a first downlink signaling channel frame $60_i$ includes an active subscriber station field 64 indicating uplink channel $48_{pul}$ will be in random access mode, that mode can apply to uplink channel frame $72_{i+2}$ (i.e.—two frames subsequent to the present frame $72_i$). The number of frames delay to which the information in active subscriber station field 64 applies will typically be established at start up of network 20 and can be hard coded into each subscriber station 44 or can be provided to each subscriber station 44 each time it joins system 20. It is also contemplated that this frame delay information can vary between different uplink channels $48_{pul}$ or at different times and, in such cases, the appropriate frame delay information will be provided to a subscriber station 44 when it is assigned to any particular uplink channel $48_{pul}$ and/or when a change occurs.

If at step 208 it is instead determined that subscriber station 44 has no data to transmit, the process returns to step 200 for that particular subscriber station 44. Otherwise, if at step 208 it is determined that subscriber station 44 has data to transmit, at step 212 the data is assembled, arranged and packaged for transmission and is transmitted in the frame to which the received active subscriber station field 64 applied. The signaling information field 68 which was included in the downlink signaling channel frame 60 authorizing the subscriber station 44 to transmit will also include a bit advising subscriber stations 44 whether to transmit using frame structure $72_{ula}$ or $72_{ulb}$ and can include other packing information, including the spreading factor to be used. When uplink channel $48_{pul}$ is in random access mode, frame structure $72_{ula}$ will be indicated as it is not known whether power control information is current for the transmitting subscriber station 44.

The assembled and packaged transmission from subscriber station 44 will include the above-mentioned indication of the amount of data subscriber station 44 has in its queues to transmit and, in some cases, an indication of the priority of that data. After the transmission has been scheduled, the process returns to step 200 and the transmission will be performed at the appropriate frame.

As is apparent to those of skill in the art, in random mode it is possible that two or more subscriber stations 44 will transmit simultaneously to base station 24, their transmissions thus "colliding" and likely preventing base station 24 from validly receiving any transmission. In many circumstances, the loss of the transmitted data due to such collisions will be handled by higher level protocols, such as TCP, which will request a retransmission of missing data. However, it is further contemplated that, in some embodiments of the present invention not shown in FIG. 5, downlink signaling channel $48_{dsc}$ can indicate with a single bit whether a preceding transmission was correctly received at base station 24. The determination of "correctly received" can be made in a variety of manners, as will occur to those of skill in the art, including by base station 24 examining a CRC (cyclic redundancy checksum) included in the transmission.

A predefined bit, e.g.—a "correctness bit", in the signaling information field 68 of downlink signaling channel frame 60 can be set to a "1" value if a previous frame transmitted was correctly received, or it can be set to a "0" value if the previous frame was incorrectly received. Thus, after transmitting a frame of data over uplink channel $48_{pul}$ in random mode, subscriber station 44 will await confirmation of successful receipt of the frame at base station 24. As will be apparent, the correctness bit indicating whether a previous transmission was correctly received is transmitted in a subsequent downlink signaling channel frame 60 which could be intended for another subscriber station $44_x$ but, as all subscriber stations 44 assigned to the uplink channel $48_{pul}$ and the corresponding downlink signaling channel $48_{dsc}$ receive each downlink signaling frame 60, the subscriber station $44_z$ which made the preceding transmission will receive and utilize the bit.

If the confirmation is not received in the appropriate downlink signaling channel $48_{dsc}$ frame 60 (the "appropriate" frame being a known number of frames after the transmission on uplink channel $48_{pul}$ was completed, to allow time for analysis of the received data and determination of its correct reception), the subscriber station $44_z$ can mark the data for retransmission to base station 24.

While it is possible that a transmission from one subscriber station 44 will be correctly received despite the fact that at least one other subscriber station 44 was also transmitting at the same time, and wherein both subscriber stations 44 will thus believe that the correctness bit value returned to them by the downlink signaling channel $48_{dsc}$ applies to their last transmission, this has a relatively low probability of occurring and thus this single correctness bit indication technique can, in many cases, provide an effective method of verifying reception of a frame $72_{ul}$ transmitted in random access mode.

Thus, if a subscriber station 44 has transmitted in random access mode and does not receive the "1" bit indication of a successful transmission, it can retransmit on the next available frame $72_{ul}$ without requiring the involvement and overhead of higher level protocols. In the unlikely event of the correctness bit incorrectly indicating a successful transmission, wherein the transmission of one subscriber station $44_i$ is received despite a simultaneous transmission by another subscriber station $44_h$ as described above, the higher level protocols can correct the error for the transmission from subscriber station $44_h$ in conventional manners, such as by the TCP retransmit request, if this is desired.

It is also contemplated that, in another embodiment, in addition to the "correctness bit", the downlink signaling channel frame 60 can include a specific indication of the subscriber station 44 which it correctly received a transmission from. If a collision occurred, no identifier of a subscriber station 44 is provided. This may provide advantages in circumstances wherein too many collisions occur regularly.

If at step 204 it is determined that uplink channel $48_{pul}$ is in polled mode, then at step 216 a determination is made as to whether the subscriber station 44 is authorized to transmit on uplink channel $48_{pul}$. This is determined by examining active subscriber station field 64 in the downlink signaling channel frame 60. If the active subscriber station identified in field 64 is not the present subscriber station 44, that particular subscriber station 44 is not authorized to transmit at this time and the process returns to step 200.

If the active subscriber station 44 identified in field 64 is the present subscriber station 44, the process proceeds to step 212 where data to be transmitted to base station 24 is assembled, arranged, packaged and transmitted to base station 24 on the respective frame of uplink channel $48_{pul}$. When uplink channel $48_{pul}$ is in polled mode, signaling information field 68 will indicate if the subscriber station 44 is to transmit using frame structure $72_{ula}$, if this subscriber station 44 transmitted on the preceding frame 72 and thus the power control information for the subscriber station 44 is current, or using frame structure $72_{ulb}$ if the power control information is not current because another subscriber station 44, or no subscriber station 44, transmitted on the preceding frame 72.

It should be noted that, unlike the case for random mode transmissions, if a subscriber station 44 is identified as the active subscriber station 44 in active subscriber station field 64, it will transmit to base station 24 even if it has no other data to be sent. In such a case, the transmission will merely indicate that subscriber station 44 has zero length queues.

It is contemplated that for a majority, or at least a significant portion, of time, system 20 will operate in polled mode. In polled mode, base station 24 polls each of the subscriber stations 44 assigned to that uplink channel $48_{pul}$ at intervals. This polling is accomplished by simply authorizing each subscriber station 44, in turn, to use uplink channel $48_{pul}$ by making them the active subscriber station 44 identified in active subscriber station field 64. As mentioned above, a subscriber station 44 will always forward at least an indication of its queue lengths to base station 24 when the subscriber station is the identified active subscriber station. If the subscriber station 44 has additional data to transmit, the remainder of the payload in traffic data field 80 will be filled with this additional data.

Base station 24 executes a scheduling process which monitors the queue lengths and priorities of the associated data awaiting transmission from the subscriber stations 44 assigned to each uplink channel $48_{pul}$ and appropriately identifies an active subscriber station 44 in each frame 60 of downlink signaling channel $48_{dsc}$. In a simple and specific example, if an uplink channel $48_{pul}$ is serving eight subscriber stations 44 and the scheduler in base station 24 merely schedules the subscriber stations 44 on an equal-access basis, each subscriber station 44 will be able to transmit every eighty milliseconds (i.e.—every eighth frame 72, which has a ten millisecond duration). In a more useful example, the scheduler can schedule each subscriber station 44 to be the active subscriber station at least every two-hundred milliseconds and, as each frame 72 has a ten millisecond duration, this means that a subscriber station 44 is able to transmit to base station 24 no less frequently than every twentieth frame. The intervening frames 72 are thus assigned by the scheduler in base station 24 responsive to the reported queue lengths and priorities of data waiting to be transmitted from subscriber stations 44. For example, if data to be transmitted is latency sensitive, the intervening frames 72 can be first assigned to subscriber stations 44 with such data queued to be transmitted.

Figure 6:
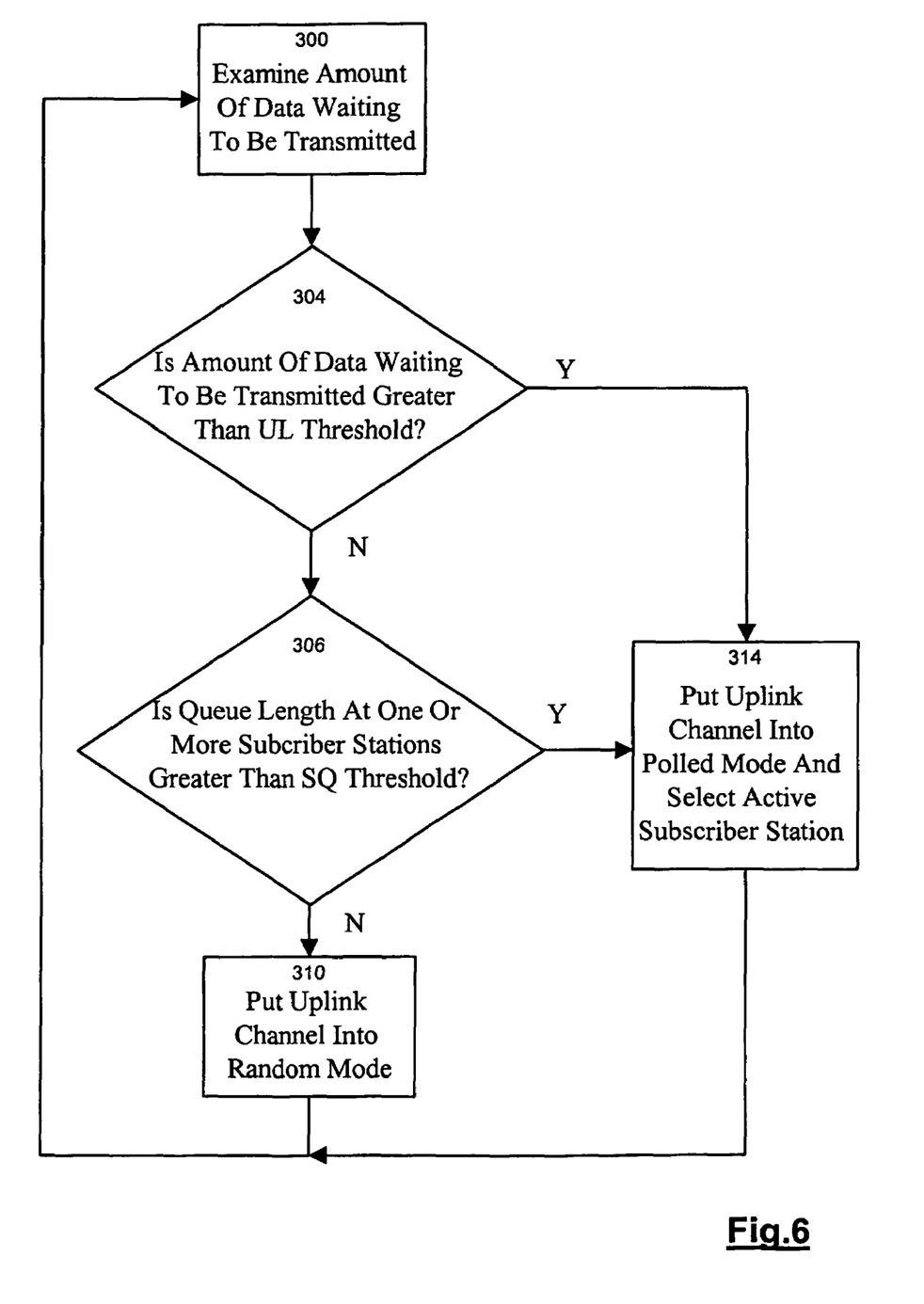
FIG. 6 is a flow-chart showing a method of managing the uplink shown in FIG. 1 in accordance with another aspect of the invention.

FIG. 6 shows a flowchart of an example of a process employed by system 20 to operate uplink channels $48_{pul}$. This portion of the process comprises determining whether an uplink channel $48_{pul}$ should be in random or polled mode. If, as is expected to be the norm, a base station 24 operates more than one uplink channel $48_{pul}$, this process is performed for each uplink channel $48_{pul}$.

At step 300, the scheduler for base station 24 checks the reported amounts of data enqueued at each subscriber station 44 served by the uplink channel $48_{pul}$. As mentioned above, each time a subscriber station 44 transmits to base station 24, whether in random mode or polled mode, it reports the amount of data queued at the subscriber station 44 to be transmitted. At step 304, the scheduler determines whether the aggregate amount of data waiting to be transferred is greater than the UL Threshold, which is a threshold value defined for the uplink channel $48_{pul}$. This threshold can be selected in any appropriate manner, but it is contemplated that typically, UL Threshold will be set to a selected percentage of the total capacity of uplink channel $48_{pul}$ for an appropriate period of time. For example, if uplink channel $48_{pul}$ has a total capacity of six-hundred and forty kbps (kilobits per second), UL Threshold may be set to a value equal to twenty five percent of the uplink capacity of forty frames, i.e.—twenty-five percent of six-hundred bits times forty, for sixty-four thousand bits.

If at step 304 it is determined that the aggregate amount of queued data at all subscriber stations 44 served by the uplink channel $48_{pul}$ is less then UTL Threshold, then at step 306, the scheduler determines whether the queue length at one or more subscriber stations exceeds a subscriber queue threshold, SQ Threshold. The subscriber queue threshold, SQ Threshold, can be selected in a variety of manners, but it is contemplated that it will be selected to be equal to the amount of data that uplink channel $48_{pul}$ can transmit in a selected number of frames, for example four (if uplink channel $48_{pul}$ has a capacity of six-hundred and forty-thousand bits per second, thus six-thousand, four hundred bits per frame—SQ Threshold would be twenty-five thousand, six-hundred bits).

If at step 306 no subscriber station 44 served by uplink channel $48_{pul}$ has a length greater than SQ Threshold, then at step 310 the scheduler will put uplink channel $48_{pul}$ into random mode for the next frame (which, as mentioned above, can be one or more frames later) and the process repeats to step 300.

If at step 304 it is determined that the aggregate amount of data enqueued at the subscriber stations 44 served by uplink channel $48_{pul}$, at step 314 the scheduler selects one of the subscriber stations 44 with data enqueued to be transmitted to be the active subscriber station and the uplink channel $48_{pul}$ is placed in polled mode with the selected subscriber station identified as the active subscriber station 44.

If at step 306 it is determined that the queue length at one or more subscriber stations 44 exceeds the SQ Threshold, at step 314 the scheduler selects one of the subscriber stations 44 whose queue length exceeds SQ Threshold to be the active subscriber station and the uplink channel $48_{pul}$ is placed in polled mode with the selected subscriber station identified as the active subscriber station 44.

As will be apparent to those of skill in the art, many variations on the process are possible and are in fact contemplated. For example, it is contemplated that if at step 306 it is determined that the queue length at a subscriber station 44 exceeds SQ Threshold, the scheduler can alternately place the uplink channel $48_{pul}$ into polled mode with that subscriber station 44 identified as the active subscriber station for a first frame and place the uplink channel $48_{pul}$ into random mode for a second frame for a selected number of frames. Thus, the subscriber station whose queue exceeded the SQ Threshold can be granted assured access to transmit at least some of its data while other subscriber stations 44 also have the opportunity to transmit in the random mode frames.

It is also contemplated that more than one random mode can be employed. For example, one half of the subscriber stations 44 can be allowed to transmit over uplink channel $48_{pul}$ when it is in a first random mode, identified by a reserved address such as "0" in active subscriber station field 64, and the second half of the subscriber stations 44 can be allowed to transmit over uplink channel $48_{pul}$ when it is in a second random mode, identified by another reserved address such as "1" in active subscriber station field 64. This allows some organization of subscriber stations 44 to reduce collisions between subscriber stations 44.

As should be apparent to those of skill in the art, these modes of operation can be combined to allow circumstances such as uplink channel $48_{pul}$ being in polled mode for one frame, random mode "0" for the next frame, random mode "1" for the next frame and then in polled mode again for the next frame, etc.

The scheduler can employ a variety of criteria to select the active subscriber station 44 at step 314. For example, the scheduler can select the subscriber station 44 with the largest amount of data in its queue, or can select the subscriber station with the largest amount of high priority data in its queue, if this priority information is reported to base station 24. Alternatively, the scheduler can consider the rate at which data is being added to the queue at subscriber station 44 and can select the subscriber station 44 whose queue is growing fastest to be the next active subscriber station 44 in polled mode.

The scheduler can also operate across all of the uplink channels $48_{pul}$ at a base station 24. For example, the scheduler can assign subscriber stations 44 with similar transmission characteristics to particular uplink channels $48_{pul}$ so that subscriber stations 44 can employ the data rates offered by an uplink channel $48_{pul}$. For example, ten subscriber stations 44 which have exceptional data transmission characteristics, for example due to their close proximity to base station 24, can be assigned to an uplink channel $48_{pul}$ which employs a spreading factor of four, while five subscriber stations 44 which have poor transmission characteristics, for example due to their distance from base station 24, can be assigned to another uplink channel $48_{pul}$ which employs a spreading factor of 128.

Alternatively, the scheduler can assign a spreading factor, in polled mode, for transmission on uplink channel $48_{pul}$ when assigning the active subscriber station. In such a case, the scheduler will take the total uplink transmission capacity and the various queue lengths etc., of system 20 into account and will assign appropriate spreading factors to various uplink channels $48_{pul}$ to efficiently utilize the transmission resources.

Figure 7:
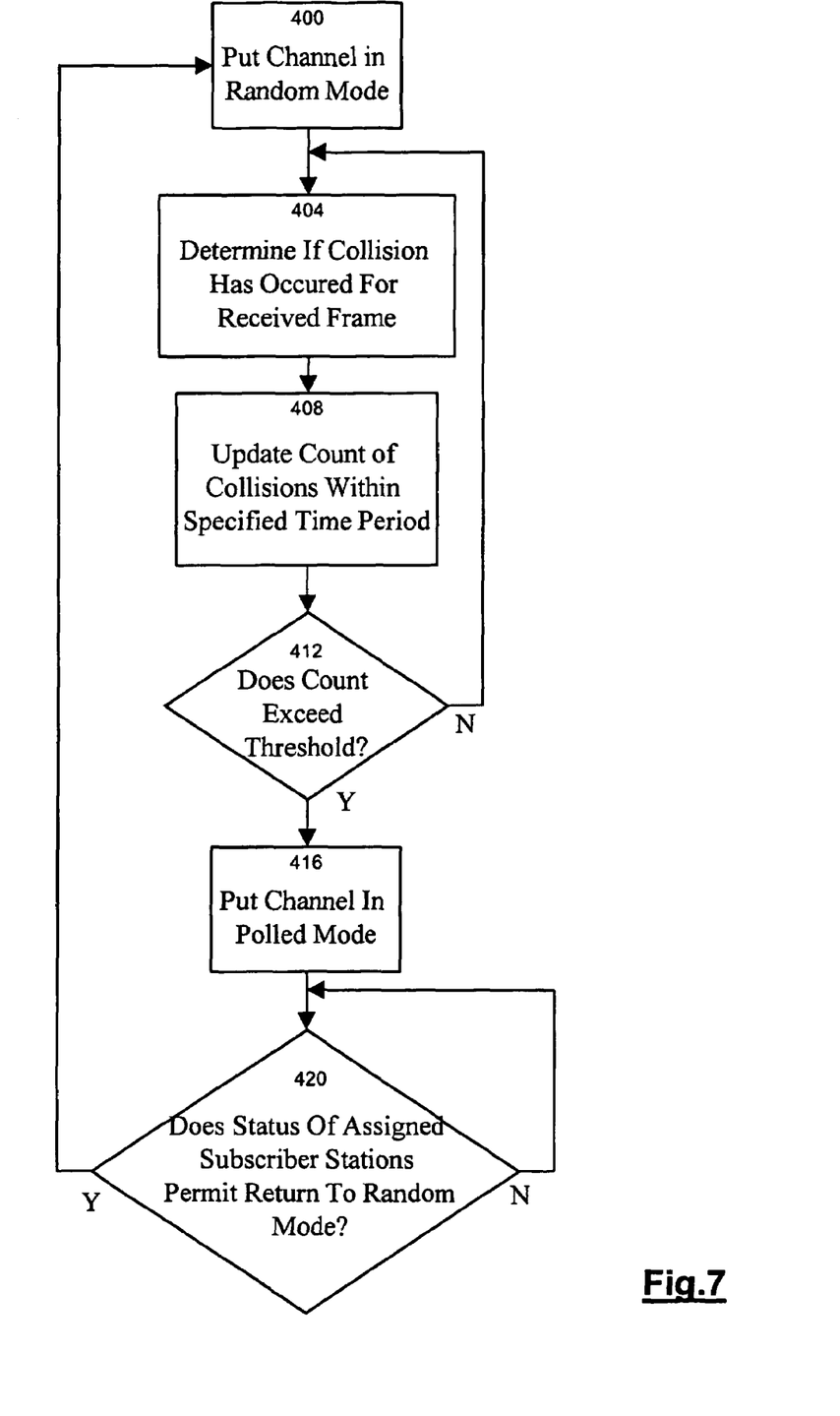
FIG. 7 is a flow chart showing another method of managing the uplink shown in FIG. 1 in accordance with another aspect of invention.

Yet another method of operating an uplink channel $48_{pul}$ in system 20 is contemplated, as shown in FIG. 7. In this method, at step 400 uplink channel $48_{pul}$ is in random mode. At step 404 a determination of whether a collision has occurred in the last received frame 72. One method for making such determination can be the same method discussed above for determining the correctness bit or any other suitable method as will occur to those of skill in the art.

At step 408, a count of the total number of the determined collisions which have been experienced within a given time period, is updated. At step 412, a determination of whether the present count determined in step 408 exceeds a predetermined threshold of permitted collisions. If this threshold is not exceeded, the process returns to step 404.

If this threshold is exceeded at step 412, the method proceeds to step 416 wherein the uplink channel $48_{pul}$ is placed into polled mode and the scheduler operation in base station 24 polls the subscriber stations 44 assigned to the uplink $48_{pul}$. At step 420 a determination is made as to whether the status of the subscriber stations 44 assigned to uplink channel $44_{pul}$ permit the return to random mode. This can be determined by considering the number of subscriber stations 44 with data enqueued for transmission to base station 24, the total amount of data enqueued at those subscriber stations, and/or the priority of that data. The actual values and strategies used for this determination will depend upon a variety of factors including the service levels the operator of network 20 wishes to provide their customers, the transmission capacity of uplink channel $48_{pul}$, etc. and can be varied at different times during network operations and/or for different uplink channels $48_{pul}$.

If the amount of data at step 420 does not permit a return to random mode, the method returns to step 420 for the next received frame. As will be apparent to those of skill in the art, the status of the assigned subscriber stations 44 will be updated after receipt of each frame 72 and re-evaluated at each iteration through step 420.

Once the status of the assigned subscriber stations 44 at step 420 permits a return to random mode, the process returns to step 400 wherein the uplink channel $48_{pul}$ is put into random mode again.

Simply put, the scheduler operation in base station 24 determines a count of the collisions it has experienced within a given time period, for example two hundred milliseconds. If this count exceeds a threshold, for example seven, then the uplink channel $48_{pul}$ can be switched to polled mode until random mode can be returned to.

The above-described embodiments of the invention are intended to be examples of the present invention and alterations and modifications may be effected thereto, by those of skill in the art, without departing from the scope of the invention which is defined solely by the claims appended hereto.

We claim:

1. A radio communication system comprising:
   a base station;
   a plurality of subscriber stations;
   a channel structure operating between said base station and plurality of subscriber stations, said channel structure including an uplink channel and an associated downlink signaling channel, said uplink channel and downlink signaling channel shared by at least two of said plurality of subscriber stations and said base station, said associated downlink signaling channel indicating to said at least two subscriber stations whether said uplink channel is in polled mode, wherein one of said at least two subscriber stations is specified to next transmit to said base station over said uplink channel, or random mode, wherein any of said at least two subscriber stations with data to be sent to said base station can next attempt to transmit to said base station over said uplink channel,
   wherein said base station, on startup and upon receiving a transmission over said uplink channel from one of said at least two subscriber stations, places said uplink channel into a selected one of said modes for a next transmission over said uplink channel;
   wherein said associated downlink signaling channel also provides transmission power control information to a subscriber station transmitting on said uplink channel;
   wherein a transmitting subscriber station does not transmit payload data until it receives a selected amount of transmission power control information from said base station;
   wherein said selected amount of transmission power control data is a portion of a first transmission time slot; and
   wherein, when said uplink channel is in polled mode and a first subscriber station is selected to transmit for two or more contiguous transmission time slots, said first subscriber station transmits payload data for the entire time slot of each time slot it is selected for after said first time slot.

2. The radio communication system of claim 1 wherein, when data is transmitted over said uplink channel in random mode, said associated downlink signaling channel subsequently provides an indication of successful reception at said base station.

3. The radio communication system of claim 2 wherein said indication of successful reception further comprises an indication of which subscriber station said transmission was successfully received from.

4. The radio communication system of claim 1 wherein each time a subscriber station transmits to said base station, the transmission includes an indication of the amount of data waiting to be transmitted from said subscriber station.

5. The radio communication system of claim 4 wherein said indication further includes an indication of the priority of data waiting to be transmitted.

6. The radio communication system of claim 1 wherein said base station further includes a scheduler which determines the amount of data to be transmitted from said at least two of said plurality of subscriber stations to said base station and places said uplink channel into random mode when said determined amount is less than a predetermined amount and in polled mode when said determined amount is not less than said predetermined amount.

7. The radio communication system of claim 6 wherein said scheduler also compares the amount of data to be transmitted from each of said at least two of said plurality of subscriber stations to a second predetermined amount and places said uplink channel into random mode when said amount of data to be transmitted from each of at least two of said plurality of subscriber stations is less than said second predetermined amount and in polled mode when said amount of data to be transmitted from any of at least two of said plurality of subscriber stations is not less than said second predetermined amount.

8. The radio communication system of claim 1 wherein said scheduler places said uplink channel into random mode until the number of collisions which occurs within a given time period exceed a predetermined number when said scheduler will place said uplink channel into polled mode.

9. The radio communication system of claim 1 further comprising at least two uplink channels and associated downlink signaling channels, said base station assigning different sets of said plurality of subscriber stations to use each of said two uplink channels.

10. The radio communication system of claim 9 wherein a first one of said at least two uplink channels has a transmission capacity greater than a second one of said at least two uplink channels and said base station assigns subscriber stations with higher transmission capacity needs to said first one uplink channel and assigns subscriber stations with lesser transmission capacity needs to said second one uplink channel.

11. The radio communication system of claim 10 wherein said assignment of said subscriber stations to said uplink channels is reviewed periodically and said subscriber stations are reassigned between said first one and said second one uplink channel as appropriate.

12. The radio communication system of claim 1 wherein said system includes at least two uplink channels, each having an associated downlink signaling channel, and said base station being operable to assign different ones of said at least two subscriber stations to use each of said at least two uplink channels.

13. The radio communication system of claim 12 wherein said base station is responsive to the level of utilization of each of said at least two uplink channels to reassign subscriber stations between said at least two uplink channels.

14. The radio communication system of claim 12 wherein at least one of said at least two uplink channels has greater transmission capacity than another of said at least two uplink channels.

15. A method of operating a radio communication system including a base station and a plurality of subscriber stations, the system having a communication channel structure including an uplink channel and an associated downlink signaling channel shared by at least two of said plurality of subscriber stations, the method comprising the steps of:

(i) said base station placing said uplink channel into one of a random mode and a polled mode;

(ii) communicating to said at least two subscriber stations via said associated downlink signaling channel the operating mode of said uplink channel and, if said operating mode is polled, the one of said at least two subscriber stations which is selected to use said uplink channel;

(iii) each of said at least two subscriber stations determining said operating mode of said uplink and:
 (a) if said operating mode is random, any of said at least two subscriber stations having data to be transmitted to said base station transmitting that data over said uplink channel; or
 (b) if said operating mode is polled, each of said at least two subscriber stations further determining if it is the selected subscriber station, the selected subscriber station transmitting to said base station over said uplink channel and each other of said at least two subscriber stations not transmitting;

(iv) said base station receiving said transmission over said uplink channel and placing said uplink channel into a selected operating mode for a next transmission; and (v) repeating steps (ii) through (v), wherein said associated downlink signaling channel provides transmission power control information to a subscriber station transmitting on said uplink channel;

wherein a transmitting subscriber station does not transmit payload data until it receives a selected amount of transmission power control information from said base station;

wherein said selected amount of transmission power control data is a portion of a first transmission time slot; and wherein, when said uplink channel is in polled mode and a first subscriber station is selected to transmit for two or more contiguous transmission time slots, said first subscriber station transmits payload data for the entire time slot of each time slot it is selected for after said first time slot.

16. The method of claim 15 wherein step (iv) comprises maintaining said selected operating mode as random mode until a selected number of collisions occur within a selected timeframe after which said operating mode is set to polled for at least a period of time.

17. The method of claim 16 wherein said period of time for said operating mode to be polled is the time necessary for the amount of data waiting at said at least two subscriber stations to fall below a selected threshold amount.

18. The method of claim 15 wherein said base station includes at least two uplink channels and associated downlink signaling channels and further including the step of assigning each of said at least two subscriber stations to use a different one of said at least two uplink channels and the associated downlink signaling channel and wherein steps (i) through (v) are performed for each of said at least two uplink channels.

19. The method of claim 15 wherein said base station includes at least two uplink channels and associated downlink signaling channels, wherein at least one of said at least two uplink channels has greater transmission capacity than another of said at least two uplink channels, and further including the step of assigning each of said at least two subscriber stations to use a different one of said at least two uplink channels and the associated downlink signaling channel and wherein steps (i) through (v) are performed for each of said at least two uplink channels.

20. The method of claim 19 further comprising the step of the base station monitoring the level of utilization of each of said at least two uplink channels and reassigning subscriber stations between said at least two uplink channels to improve the balance of utilization of the at least two uplink channels.

21. The method of claim 15 wherein each subscriber station in transmitting over said uplink channel provides at least an indication of the amount of data it has to be transmitted to said base station.

22. A subscriber station for use in a communication system having a base station and a plurality of subscriber stations, said communication system having a channel structure including an uplink channel and an associated downlink signaling channel shared by at least two of said plurality of subscriber, said associated downlink signaling channel indicating to said plurality of subscriber stations whether said uplink channel is in polled mode, wherein one of said plurality of subscriber stations is specified to next transmit to said base station over said uplink channel, or random mode, wherein any of said plurality of subscriber stations with data to be sent to said base station can next attempt to transmit to said base station over said uplink channel, said associated downlink signaling channel also providing transmission power control information to a subscriber station transmitting on said uplink channel, and said base station operable, on startup and upon receiving a transmission over said uplink channel from one of said plurality of subscriber stations, to place said uplink channel into a selected one of said modes for a next transmission over said uplink channel, said subscriber station comprising:

a receiver to receive said downlink signaling channel from said base station indicating the operating mode of said uplink channel from said subscriber station to said base station;

a controller to determine from said received downlink signaling channel the operating mode of said uplink channel and, if the determined operating mode is polled, to determine from said received downlink signaling channel if the subscriber station is authorized to transmit to said base station on said uplink channel;

a processor to construct a frame of data for transmission to said base station if said subscriber station is authorized to transmit or if the determined operating mode is random and said subscriber station has data to transmit to said base station; and a transmitter to transmit said constructed frame of data to said base station over said uplink channel, said transmitter transmitting said constructed frame at transmission power levels set according to power control information received by said receiver from said base station, wherein said subscriber station does not transmit payload data until it receives a selected amount of transmission power control information from said base station;

wherein said selected amount of transmission power control data is a portion of a first transmission time slot; and wherein, when said uplink channel is in polled mode and said subscriber station is selected to transmit for two or more contiguous transmission time slots, said subscriber station transmits payload data for the entire time slot of each time slot it is selected for after said first time slot.

23. The subscriber station of claim 22 wherein, when said constructed frame of data is transmitted over said uplink channel in random mode, said downlink signaling channel subsequently provides an indication of successful reception at said base station of said constructed frame of data.

24. The subscriber station of claim 22 wherein said constructed frame of data includes an indication of the amount of data waiting to be transmitted from said subscriber station.

25. The subscriber station of claim 24 wherein said indication further includes an indication of the priority of the data waiting to be transmitted.

* * * * *